United States Patent
Lee (10) Patent No.: US 9,421,973 B2
(45) Date of Patent: Aug. 23, 2016

(54) JERK REDUCTION IN TRANSITION BETWEEN LANE-CENTERING AND LANE-KEEPING STEERING SYSTEMS

(71) Applicant: GM Global Technology Operations LLC, Detroit, MI (US)

(72) Inventor: Jin-Woo Lee, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/193,178

(22) Filed: Feb. 28, 2014

(65) Prior Publication Data

US 2015/0248132 A1 Sep. 3, 2015

(51) Int. Cl.
| B60W 30/10 | (2006.01) |
| B62D 15/00 | (2006.01) |
| G05D 1/00 | (2006.01) |
| B62D 15/02 | (2006.01) |

(52) U.S. Cl.
CPC ............ B60W 30/10 (2013.01); B62D 15/025 (2013.01); G05D 1/0055 (2013.01); G05D 1/0088 (2013.01)

(58) Field of Classification Search
None
See application file for complete search history.

(56) References Cited

U.S. PATENT DOCUMENTS

| 4,401,181 | A * | 8/1983 | Schwarz | B60K 31/0058 180/168 |
| 9,296,382 | B2 * | 3/2016 | Fung | B60W 10/18 |
| 2002/0105438 | A1 * | 8/2002 | Forbes | G07C 5/0891 340/901 |
| 2007/0164852 | A1 * | 7/2007 | Litkouhi | B60G 17/0195 340/435 |
| 2011/0015850 | A1 * | 1/2011 | Tange | B60W 30/12 701/116 |
| 2011/0231095 | A1 * | 9/2011 | Nakada | B60W 30/12 701/301 |
| 2012/0050074 | A1 * | 3/2012 | Bechtel | B60R 1/04 340/988 |
| 2012/0212353 | A1 * | 8/2012 | Fung | B60K 28/06 340/905 |
| 2012/0265431 | A1 * | 10/2012 | Hayakawa | B60T 7/22 701/301 |
| 2012/0316730 | A1 * | 12/2012 | Zhang et al. | 701/41 |
| 2013/0190985 | A1 * | 7/2013 | Nakano et al. | 701/41 |
| 2013/0231830 | A1 * | 9/2013 | Van Dan Elzen | B60W 50/14 701/42 |
| 2013/0245886 | A1 * | 9/2013 | Fung | B60K 28/06 701/36 |
| 2013/0274985 | A1 * | 10/2013 | Lee | B60W 10/20 701/23 |
| 2014/0244153 | A1 * | 8/2014 | Dorum | G01C 21/3632 701/409 |
| 2015/0117714 | A1 * | 4/2015 | Okuda | 382/104 |

* cited by examiner

*Primary Examiner* — Rami Khatib
*Assistant Examiner* — Jeffrey Boomer
(74) *Attorney, Agent, or Firm* — Mark S. Cohen; Pearl Cohen Zedek Latzer Baratz LLP (57) ABSTRACT

A system and method of autonomously steering a vehicle responsively to failure of a lane-centering system through time-dependent steering angle correction to reduce jerk resulting from transition of steering control from a lane-centering system to a lane-keeping system or vise-versa.

14 Claims, 7 Drawing Sheets

JERK REDUCTION IN TRANSITION BETWEEN LANE-CENTERING AND LANE-KEEPING STEERING SYSTEMS

FIELD OF THE PRESENT INVENTION

The present invention relates to autonomous steering systems, and specifically, relates to the reduction of jerk during transfer of steering control from lane-centering to lane-keeping systems or from lane-keeping to lane-centering systems.

BACKGROUND

Examples of autonomous steering systems include a lane-centering system directed at maintaining vehicle travel centered within a travel lane and a lane-keeping system directed at restoring travel within the lane upon failure of lane-centering system.

BRIEF DESCRIPTION OF THE DRAWINGS

The components and their configurations, features, operation, and advantages of the steering-control system may best be understood in reference to the following detailed description in which.

It should be appreciated that the sake of clarity certain elements in the figures may not be drawn to scale and reference labels may be repeated thought the figures to indicate corresponding or analogous elements.

DETAILED DESCRIPTION

The following description sets forth numerous details to provide a thorough understanding of the jerk reduction system and it may be practiced without these specific details. It should also be appreciated that components and methods well-known to those skilled in the art have been omitted for the sake of clarity.

The terms "autonomous", "semi-autonomous", "automated", and "automatic" all refer to a steering-control system of a motor vehicle configured to control a path of travel on a road or a lane with reduced driver input.

The steering-control system includes a primary steering system implemented as a lane-centering system configured to maintain vehicle travel centered within a lane or designated travel zone and a back-up system implemented as a lane-keeping system configured to restore travel to the designated travel zone responsively to vehicle travel straying from the travel zone, according to an example.

In some examples, the steering-control system is configured to enable a driver to regain either long-term or momentary control of the vehicle from either of the lane-centering or the lane-keeping systems. In some examples, after lane-keeping system succeeds in restoring travel to the proper travel zone, steering control is automatically returned to the lane-centering system.

Lane-centering system failure may be caused by, inter alia, erroneous deactivation, miscalculation of a corrective steering-angle, and misinterpretation of a travel position.

The lane-centering or lane-keeping systems, in certain examples, sends corrective steering-angle commands to steering systems like, inter alia, an electrical power steering (EPS) system, or an active front steering (AFS) system or other steering systems.

Figure 1:
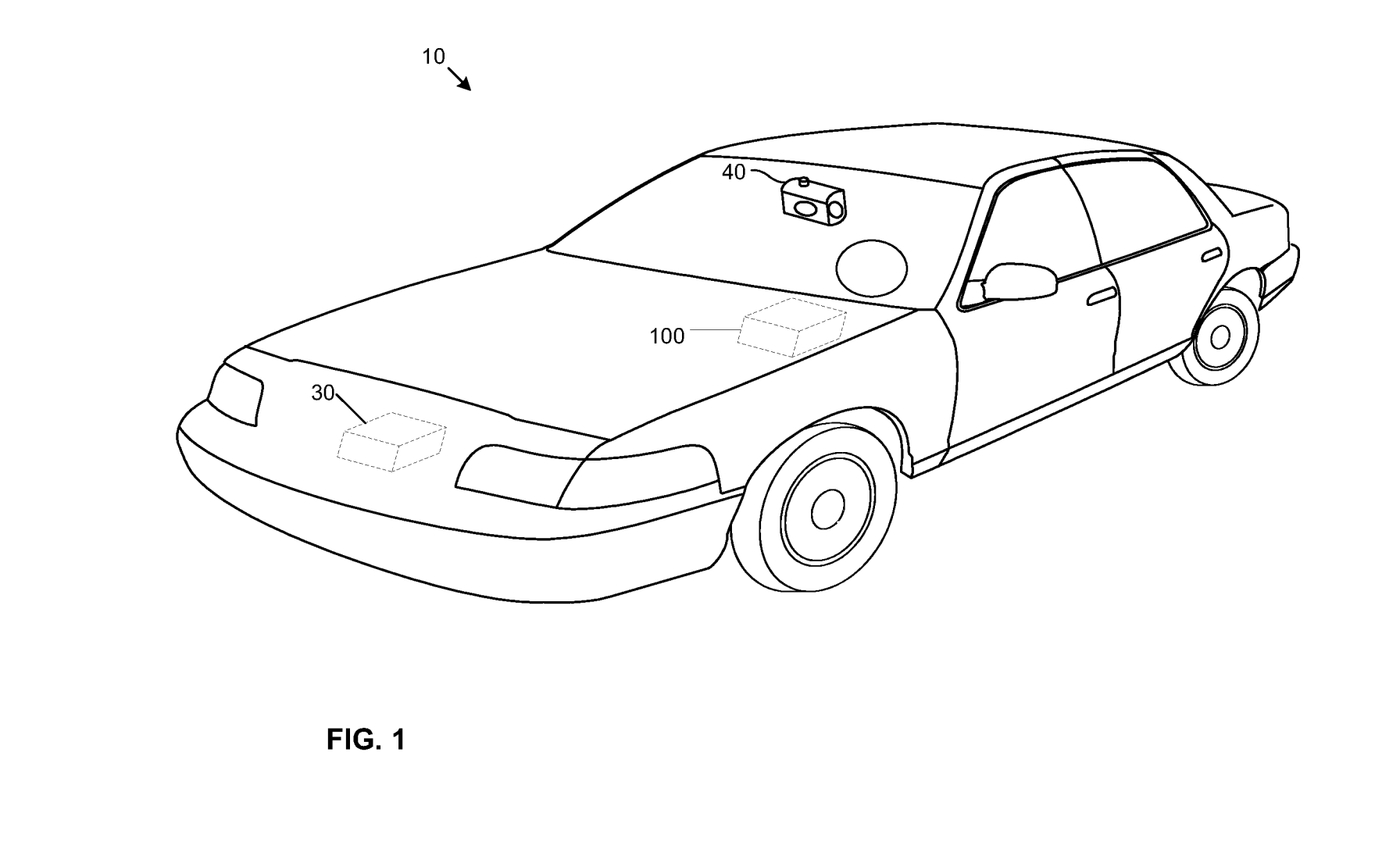
FIG. 1 is a schematic, perspective view of a vehicle equipped with a steering-control system, according to an example.

Turning now to the figures, FIG. 1 is a schematic illustration of a vehicle 10 equipped with an autonomous steering-control system 100 including both lane-centering and a lane-keeping systems, sensor arrays 40, and vehicle-dynamic sensors 30.

Road sensor array 40 is configured to capture data that may be used or processed by the steering-control system 100 to indentify vehicle position. Sensor array 40 are implemented as any one or combination of sensors like, inter alia, video cameras, Light Detection And Ranging (LIDAR) sensors, Laser Detection and Ranging (LADAR) sensors, radar, optical remote sensors, or other sensors providing data related to vehicle location with respect to road features like lane markers, road shoulders, median barriers, road edge, and other objects or features. Without diminishing in scope, the present discussion will discuss sensor array 40 implemented as a camera array.

In some examples, vehicle 10 includes vehicle-dynamic sensors 30 like, inter alia, steering angle sensors, steering torque sensors, wheel speed sensors, inertial measurement units configured to capture vehicle dynamic parameters like, inter alia, steering angle and torque, lateral and longitudinal velocity, lateral and longitudinal velocity changes, yaw-rate, and wheel rotation.

Figure 2:
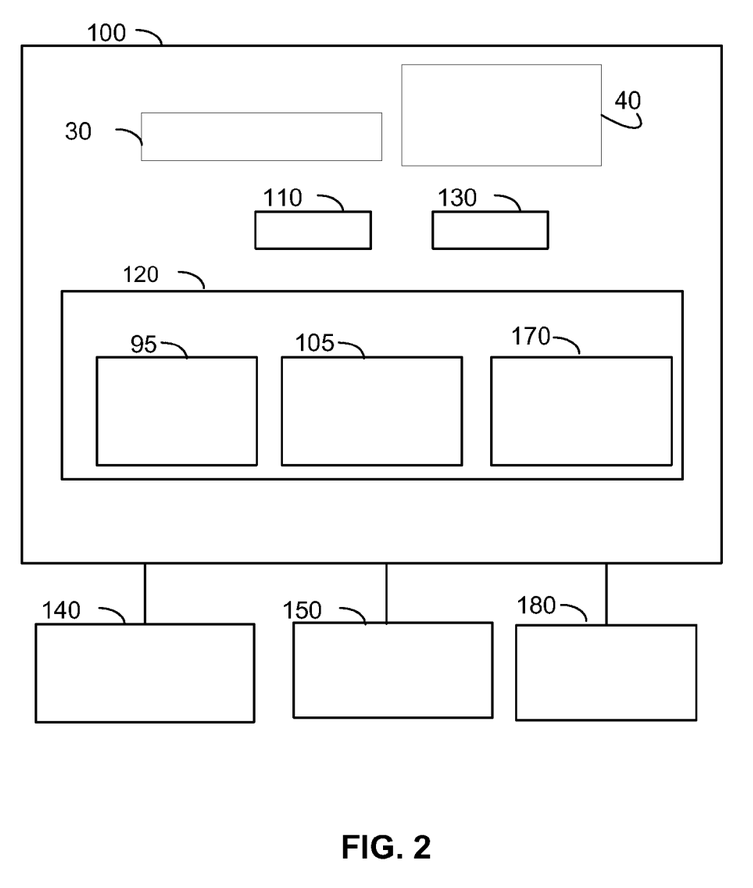
FIG. 2 is a block diagram of a steering-control system, according to an example.

FIG. 2 is a block diagram of an autonomous steering-control system 100 according to an example, including one or more processors 110, vehicle-dynamic array 30, road sensor array 40, long-term non-transitory storage 130, memory 120 loaded with a lane-centering module 95, a lane-keeping module 105, a database 170 of vehicle dynamic information, digital-road data, or other relevant information. Steering-control system 100 also includes long term storage 170, user-input device 140 and user-output device 150. Input device 140 may be implemented as touch-screens, keyboard, microphone, pointer device, or other devices providing such functionality. User output device 150 may be implemented as any one or combination devices like a display screen, speakers or headphones, or other devices providing such functionality.

Long term storage System 100 may also include a global positioning system (GPS) receiver 180.

Memory 120 may be implemented as Random Access Memory (RAM) or other memory types providing such functionality.

Long-term non-transitory storage 130 may be implemented as a hard disk drive or other suitable non-volatile memory.

Figure 3:
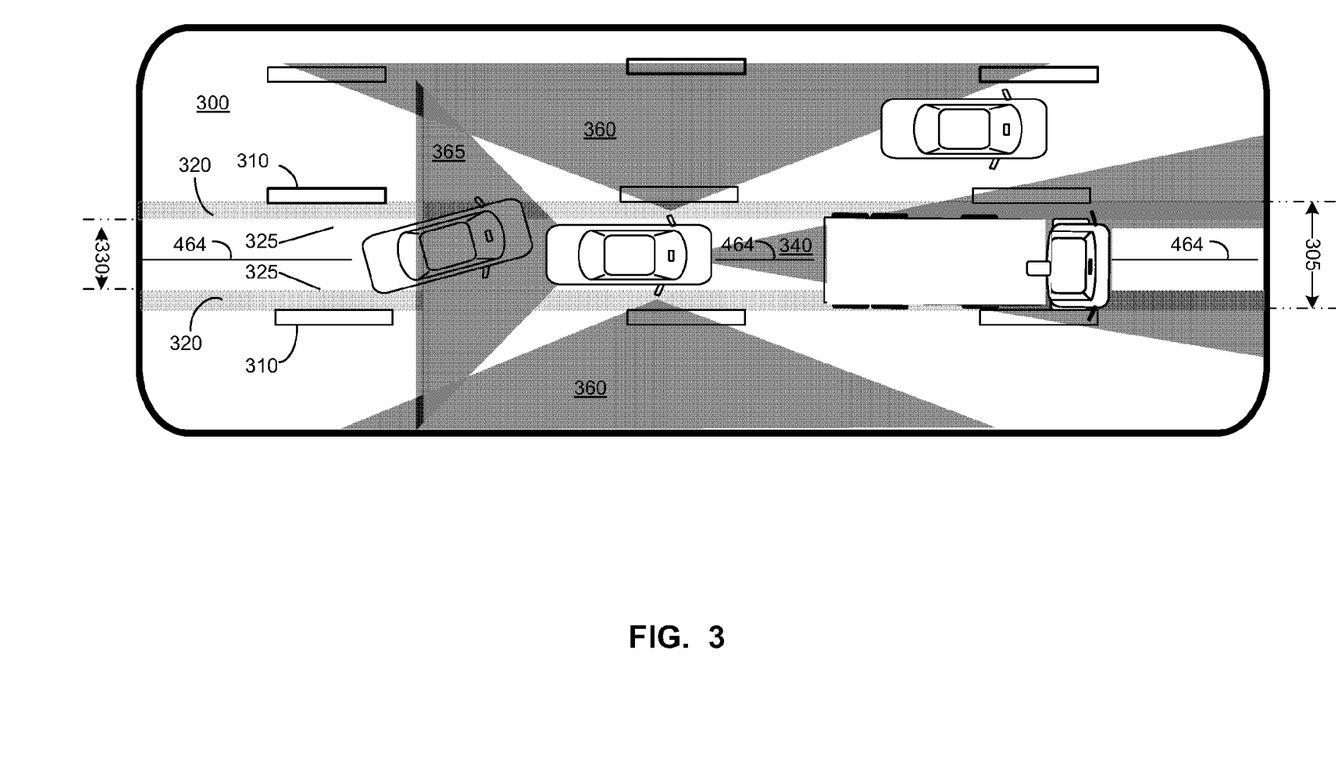
FIG. 3 is a schematic, top view of a lane environment, as viewed by a sensor array of a steering-control system, according to an example.

For the purposes of this document, lane-centering functionality provided by the lane-centering module 95 renders the steering-control system 100 into a lane-centering system and, analogously, the lane-keeping functionality provided by the lane-keeping module 105 renders the steering-control system 100 into a lane-keeping system such that the lane-steering system 100 includes both types of steering control, according to an example FIG. 3 is a schematic, top view of vehicle 10 traveling in a demarcated lane environment and respective fields of view of a camera array, according to an example. As shown, road 300 is demarcated into a travel lane 305 by lane markers 310 that also define an outer boundary of a safety zone 320 also bound by inner boundary 325. The inner boundaries 325 and lane center-line 464 are virtually imposed by the steering-control system, according to an example. Center-lane zone 330 between safety zones 320 typically spans between 65-95% of the lane width, in certain example.

It should be appreciated that the position of vehicle 10 with respect to road features may also be determined in combination with GPS data and vehicle motion sensor data, according to other examples.

As shown, vehicle 10 frontward camera has a frontward field of vision 340 of about 80 meters and a relatively narrow viewing range of about 40 degrees, for example. Frontward camera is linked to the lane-centering system whereas sideward-viewing and reward-viewing cameras are linked to the lane-keeping system, according to an example. The side and rear viewing fields of vision 360 and 365, respectively, have a relatively short range from about 10 to 20 meters and a viewing angle of 130-180 degrees, in certain examples. Position data is processed and corrective action taken by the steering-control system every 10 milliseconds, according to an example. It should be appreciated that in other examples, processing timing is set at other set time intervals or changing time intervals.

In operation, lane-centering system functions as a primary steering control and is configured to maintain vehicle travel centered in lane center-lane zone 330 while lane-keeping system is in standby mode until vehicle 10 drifts out of the safety zone 320 at which time steering control is transferred to the lane-keeping system until vehicle travel is restored to the center-lane zone 330, as noted above.

Figure 4:
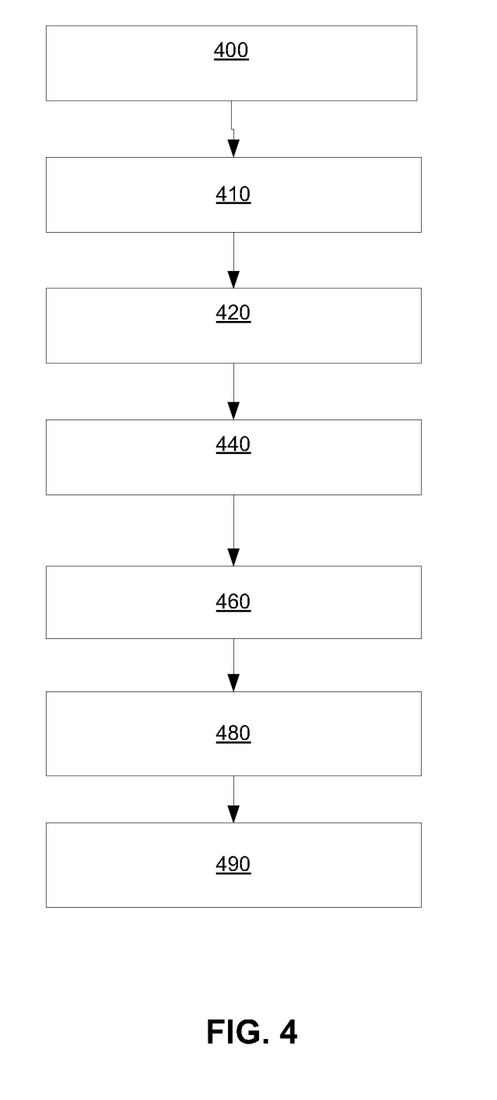
FIG. 4 is a flowchart of a method for reducing jerk when transferring steering control from a lane-centering to a lane-keeping system, according to an example.
Figure 4A:
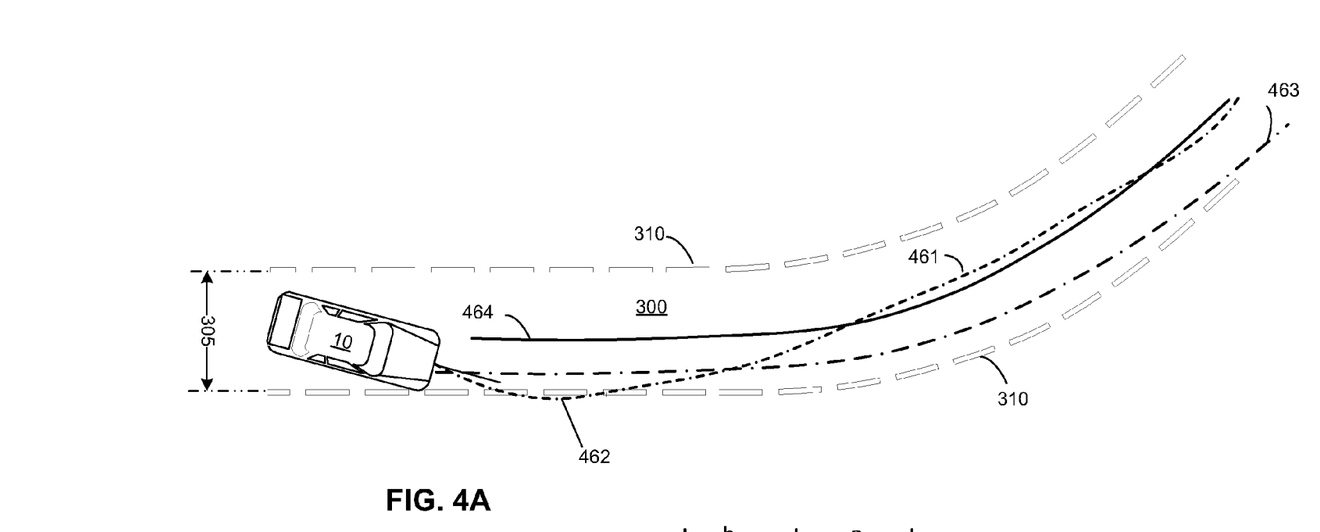
FIG. 4A is a schematic view of vehicle negotiating a curve depicting multiple steering-angle calculations on the basis of vehicle and road curvature dynamics at given time intervals, according to an example.
Figure 4B:
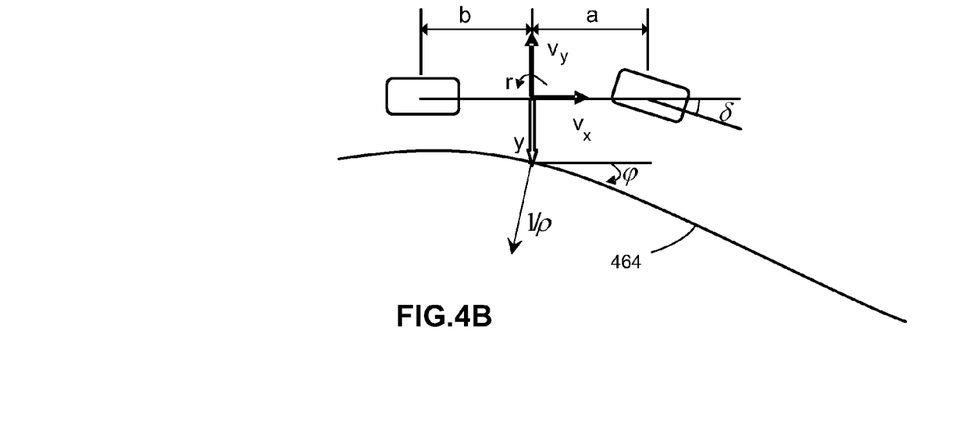
FIG. 4B is a schematic view of a vehicle dynamics model of the vehicle of FIG. 4A, according to an example.

FIG. 4 is a flow diagram depicting steps involved in generating corrective steering-angle commands while minimizing vehicular jerk or lurch and is described in reference to FIGS. 4A and 4B.

Generally, in step 400 the lane-keeping system is actuated responsively to failure of the lane-centering system. In step 410, a corrective steering angle derived from a cost function configured to minimize the lateral and the heading angle deviation of the vehicle predicted path from the lane center. Consequently, the corrective steering angle becomes large as vehicle 10 moves away from lane center 464. Often this corrective steering angle is so large that it causes motional jerk.

This cost-function steering-angle may cause excessive lateral jerk and motion discomfort. Therefore, in step 420, a vehicle-dynamic steering-angle is calculated from road curvature, "ρ" and vehicle motion measurements and is used to temper the cost-function steering-angle.

In step 440, the maximum rate at which the corrective-steering angle is applied is calculated.

In step 460, the maximum rate-of-angle change calculated in step 440 is modified in accordance with design factors, in a certain example.

In step 480, a steering-angle-command is generated in accordance with a time-schedule.

In step 490, steering control is returned to lane-centering system

Specifically, in step 400 the lane-keeping system is actuated responsively to failure of the lane-centering system, as noted above. Such failure is deemed to have occurred when steering-control system 100 identifies a front corner of vehicle 10 will traverse the inner boundary of lane marker 310 within 0.5 seconds, according to an example.

At step 410 a corrective steering angle "δ" is derived by minimizing a cost function J:

$$J = \int_0^{t_{lk}} \left\{ [y \ \phi]_{err} \cdot Q(x) \cdot \begin{bmatrix} y \\ \phi \end{bmatrix} + \delta \cdot R(t) \cdot \delta \right\} dt$$

Wherein:

$t_{lk}$ is the time duration of the lane keeping system in operation, e.g, 6 sec.

$y_{err}$ is the lateral offset error, e.g., ($y_{desired} - y_{predicted}$);

$\phi_{err}$ is the heading angle error, e.g., ($\phi_{desired} - \phi_{predicted}$); and, Q (t) and R (t) are weighting factors derived empirically.

In FIG. 4A, a sample, corrective cost-function path 461 having a relatively sharp and uncomfortable corrective steering angle 462 that must be tempered.

In step 420, vehicle-dynamic steering-angle is calculated from road curvature and vehicle motion measurements in accordance with the following vehicle dynamic equation:

$$\begin{bmatrix} \dot{y} \\ \dot{\varphi} \\ \dot{v}_y \\ \dot{r} \end{bmatrix} = \begin{bmatrix} 0 & v_x & 1 & 0 \\ 0 & 0 & 0 & 1 \\ 0 & 0 & -\frac{C_f + C_r}{mv_x} & \frac{bC_r - aC_f}{mv_x} - v_x \\ 0 & 0 & \frac{bC_r - aC_f}{Iv_x} & \frac{a^2 C_f + b^2 C_r}{Iv_x} \end{bmatrix} \cdot \begin{bmatrix} y \\ \varphi \\ v_y \\ r \end{bmatrix} + \begin{bmatrix} 0 \\ 0 \\ \frac{C_f}{m} \\ \frac{aC_f}{I} \end{bmatrix} \cdot \delta + \begin{bmatrix} 0 \\ v_x \\ 0 \\ 0 \end{bmatrix} \cdot \rho$$

As depicted in FIG. 4B:

"y" is lateral deviation from the lane center.

"φ" is heading angle deviation.

"$v_x$" is vehicle longitudinal speed.

"$v_y$" is vehicle lateral speed.

"r" is vehicle yaw rate.

"δ" is steering angle.

"a" and "b" are distances to the front and rear axle measured from the vehicle center, respectively.

"m" is vehicle mass.
"I" is vehicle inertia.
"$C_f$", "$C_r$" are front and rear cornering stiffness factors.
"ρ" is road curvature.

Values for y, ϕ, ϕ̇, v̇$_y$, ṙ may be measured from vehicle camera array 40 or vehicle-dynamic sensors 30, obtained from road data held in a data base 175, or from GPS data. Their values are plugged into the above vehicle dynamic equation and solved for "δ" at set time intervals that may be fixed anywhere between 10-100 milliseconds, according to examples.

As shown in FIG. 4A, vehicle-dynamic travel path 463 defined by the above vehicle-dynamic equation does not guide vehicle 10 to the center of lane 305 along center line 464; but rather, it follows the road curvature defined by lane markers 310 and based on the above-noted parameters. Therefore, its corrective steering angles are less than those generated by the cost function. Accordingly, vehicle-dynamic travel path 463 serves as a basis to temper relatively sharp corrective angles of cost-function travel path 461 in the following manner, according to an example.

Each vehicle-dynamic steering-angle value "δ" derived from the vehicle dynamic equation is modified by increasing it by about 50% as a safety margin and then compared to the corresponding cost-function steering-angle. If the cost-function steering-angle exceeds this modified, vehicle-dynamic steering-angle, the modified, vehicle-dynamic steering-angle is selected as the corrective steering-angle value rendered into a steering-angle command, according to a certain example.

For example, if the vehicle-dynamic steering-angle is calculated as 2°, then the value is increased by 50% bringing it 3°. If the steering-angle value calculated from the cost function optimization is 3.5°, only 3° steering angle will be employed, according to an example. It should be appreciated that in other examples, the vehicle-dynamic steering-angle is increased by differing values.

It should be appreciated that various steering angles and their rates may be rendered into corresponding torques using known relationships between steering angle and steering torque.

In step 440, the steering-control system calculates a maximum rate-of-angle change by setting the following derivation matrix equal to an empirically derived, lateral-jerk limit of 0.13 g/200 ms and solving for δ dot. All vehicle parameters are known constant vehicle parameters, $V_x$, $V_y$ may be obtained from vehicle sensors 30, according to an example. $V_x$ is assumed a constant for a short period of time at the time derivative.

$$\begin{bmatrix} \dot{v}_y \\ \dot{w} \end{bmatrix} = \begin{bmatrix} -\dfrac{C_f + C_r}{mv_x} & \dfrac{bC_r - aC_f}{mv_x} - v_x \\ \dfrac{bC_r - aC_f}{Iv_x} & \dfrac{a^2 C_f + b^2 C_r}{Iv_x} \end{bmatrix} \cdot \begin{bmatrix} v_y \\ w \end{bmatrix} + \begin{bmatrix} \dfrac{C_f}{m} \\ \dfrac{aC_f}{I} \end{bmatrix} \cdot \delta$$

At step 460, steering-control system 100 modifies the maximum rate-of-change in accordance with design parameters, in certain examples.

The modification of the maximum rate-of-change, in a certain example, is implemented as follows:

Modified Maximum Rate-of-Angle-
Change (MMRAC)(° /sec.)=
(δ dot)($k_{speed}$)($k_{curvature}$)

Wherein:
t: time elapsed in second after activation of the lane-keeping controller $k_{speed}$: weighting factor for speed dependent on speed ranges $k_{curvature}$: weighting factor for curvature For example:
$k_{speed}$ is set at a value of "1.1" for a speed range, $V_x$, between 0-30 m.p.h. and
$k_{speed}$ is set at a value of "1" for a speed range, $V_x$, between 30-65 m.p.h. and
$k_{speed}$ is set at a value of "0.9" for a speed range, $V_x$, exceeding 65 m.p.h.

Figure 5:
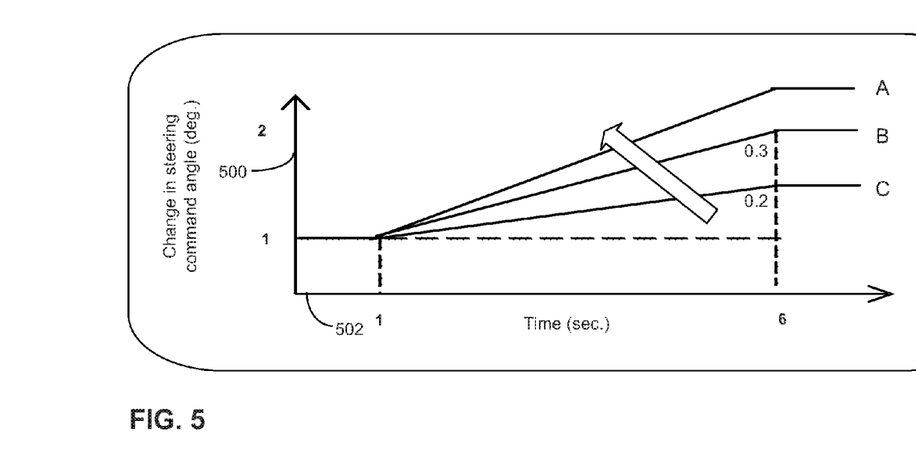
FIG. 5 is a graph depicting several limit functions depicting steering-angle limit as a function of time, according to an example.

Thus, as the speed, $V_x$, increases, the rate of steering-angle-change decreases as depicted in FIG. 5.

Similarly, $k_{curvature}$ may set in accordance with ranges of road curvatures, ρ.

For example:
$k_{curvature}$ is set at a value of "1.1" for curvatures, ρ, less than 0.001 (1/m)
$k_{curvature}$ is set at a value of "1.0" for curvatures, ρ, greater than 0.001 and less than 0.0005 (1/m)
$k_{curvature}$ is set at a value of "0.9" for curvatures, ρ, greater than 0.0005 (1/m)

Weighting factors $k_{curvature}$ and $k_{curvature}$ are derived empirically and in certain examples are stored in database 170 of steering-control system 100. Weighting factors $k_{curvature}$ and $k_{curvature}$ are design parameters selected in accordance with the vehicle design concept. For example, $k_{curvature}$ can be set at 1.2, 1.0, and 0.9 in the above ranges for a sport vehicle or 1.05, 10.0, and 0.95 for a luxury sedan.

In step 480, the steering-control system generates steering-angle-command includes the above-described corrective steering-angle derived from the cost function and vehicle dynamics and an application rate defined by the Modified Maximum Rate-of-Angle Change (MMRAC) in a time sequence in accordance with the following example:

Applied Steering limit=(MMRAC)(t−1)+1°

Wherein: "t" is time in seconds between 1.0 and 6.0 seconds after activation of the lane-keeping controller, for example. It should be appreciated that various time increments and time periods may also be employed.

In step 490 steering control is returned to lane-centering system responsively to detection of travel within the lane-center zone 330 by steering-control system, according to an example.

FIG. 5 depicts several time-dependent, steering-limit functions, "A", "B", and "C" of a steering-angle limit (degrees) 500 as a function of time (seconds) 502 during a response period commencing one second after the lane-keeping system assumes steering control to the end of the response period when proper vehicle travel has been restored and the lane-centering system has resumed steering control, according to an example. The six-second sample is merely an example of a time period in which a path of travel of a vehicle is deemed to have been restored. As shown, the slope of each steering-limit function represents a limit on the rate of steering angle-change as described above.

As shown, steering-limit function "A" no steering angle limits versus 5C depict various steering angle responses in accordance with the degree of steering.

Steering-limit function "A" achieves a maximum steering limit of 2.5° at six seconds at a maximum rate-of-angle-change of 0.5 as represented by the slope, according to an example.

Steering-limit function "B" achieves a maximum steering limit of 1.5° at six seconds at a maximum rate-of-angle-change of 0.3 as represented by the slope, according to an example.

Steering-limit function "C" achieves a maximum steering limit of 1.0° at six seconds at a maximum rate-of-angle-change of 0.2 as represented by the slope, according to an example.

Figure 5A:
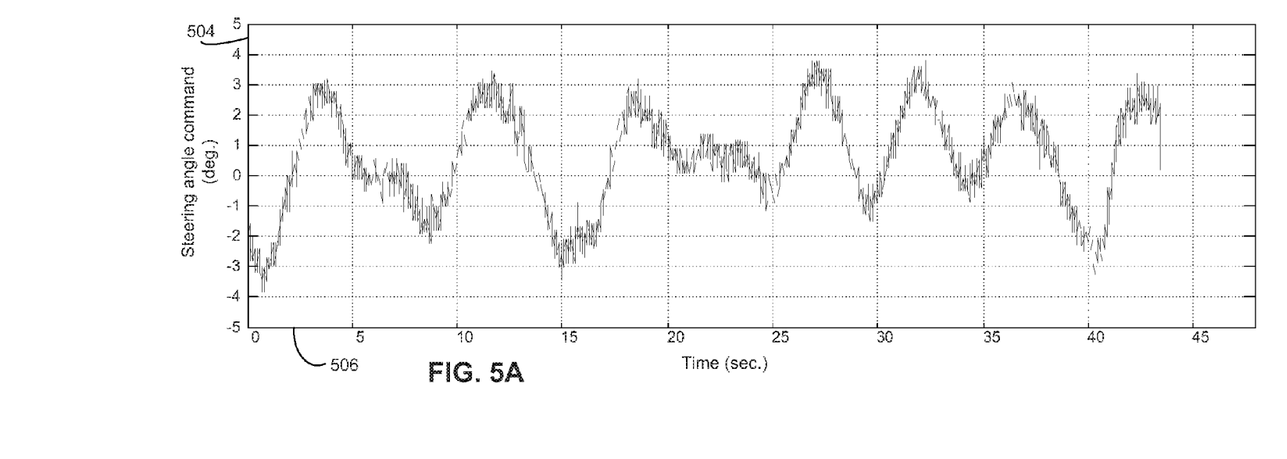
FIG. 5A is data-plot depicting steering-angle command as a function of time in which no steering-angle limit has been imposed, according to an example.
Figure 5B:
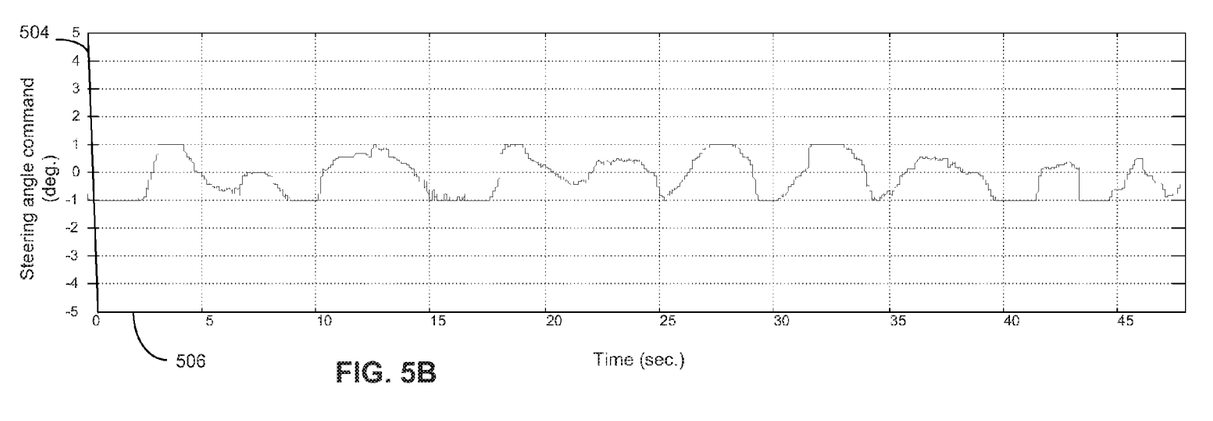
FIG. 5B is a data-plot depicting steering-angle command as a function of time in which 1.0° steering-angle limit has been imposed, according to an example.
Figure 5C:
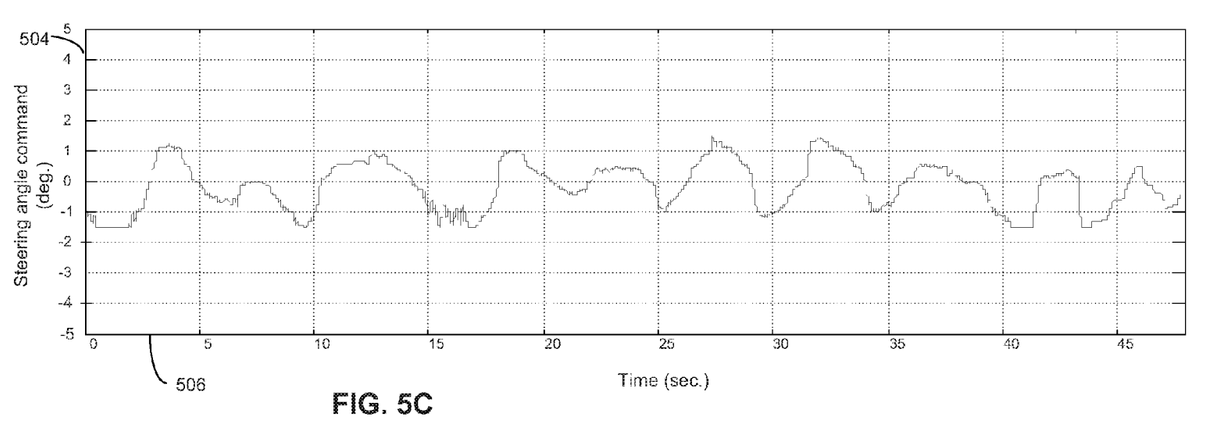
FIG. 5C is a data-plot depicting steering-angle command as a function of time in which 1.5° steering-angle limit has been imposed, according to an example.

FIG. 5A is a data plot of steering angle command (degrees) 504 as a function of time (seconds) 506 and is shown within the first six seconds; the steering level command never exceeds 2.5°. FIGS. 5B and 5C are also data plots of steering-angle command (degrees) 504 as a function of time (seconds) 506 and depict a maximum steering-angle command within the first six seconds of 1.5° and 1.0° degrees, respectively; according to examples.

It should be appreciated that additional examples may be combinations of various features set froth in the above examples explicitly.

The foregoing description of the examples of the invention has been presented for the purposes of illustration and description and is not exhaustive or limiting. It should be appreciated by persons skilled in the art that modifications, variations, substitutions, changes, and equivalents are possible in light of the above teaching.

What is claimed is:

1. A vehicular, autonomous steering-control system comprising:
    at least one image capture device mounted on a vehicle;
    a lane-centering system configured to maintain travel centered within a travel lane;
    a lane-keeping system actuated responsively to failure of the lane-centering system, the failure detected as a front corner of the vehicle traversing a lane marker of the travel lane from image data captured by the image capture device, the lane-keeping system configured to generate a plurality of corrective steering commands restoring travel within the travel lane, one or more of the steering commands at least partially defined by a minimized cost function, the steering commands limited by a time-dependent, steering-angle limit increasing with time and
    a steering system configured to implement the corrective steering commands.

2. The system of claim 1, wherein the one or more of the corrective steering commands is at least partially defined by a maximum rate-of-angle-change.

3. The system of claim 2, wherein the maximum rate-of-angle-change is at least partially defined by one or more vehicle dynamic parameters.

4. The system of claim 3, wherein the maximum rate-of-angle-change is at least partially defined by road curvature.

5. The system of claim 1, wherein the lane-keeping system is further configured to transfer steering-control to the lane-centering system responsive to achievement of corrected path of travel.

6. The system of claim 1, wherein the image capture device includes a sideward viewing sensor associated with the lane-keeping system, the sideward viewing sensor having a viewing range of 130-180 degrees.

7. The system of claim 1, wherein the image capture device includes a sideward viewing sensor associated with the lane-keeping system, the rearward viewing sensor having a viewing range between 130-180 degrees.

8. A method for autonomously steering a vehicle comprising:
    capturing image data of lane markers within which a vehicle travels with an image capture device;
    using a lane-centering system to maintain travel of a vehicle within the lane markers;
    actuating a lane-keeping system responsively to failure of the lane-centering system, the failure detected as a front corner of the vehicle traversing a lane marker of the travel lane from the image data of the lane markers;
    generating a plurality of corrective steering commands restoring vehicle travel within the lane markers; one or more of the steering commands at least partially defined by a minimized cost function, the steering commands limited by a time-dependent, steering-angle limit increasing with time; and
    implementing the corrective steering commands through a steering system.

9. The method of claim 8, wherein the one or more of the corrective steering commands is at least partially defined by a maximum rate-of-angle-change.

10. The method of claim 9, wherein the maximum rate-of-angle-change is at least partiallydefined by one or more vehicle dynamics parameters.

11. The method of claim 9, wherein the maximum rate-of-angle-change is at least partially defined by road curvature.

12. The method of claim 8, farther comprising transferring steering-control to the lane-centering system responsive to achievement of corrected a path of travel.

13. The method of claim 8, wherein the image capture device includes a sideward viewing sensor associated with the lane-keeping system, the sideward viewing sensor having a viewing range of 130-180 degrees.

14. The method of claim 8, wherein the image capture device includes a sideward viewing sensor associated with the lane-keeping system, the rearward viewing sensor having a viewing range between 130-180 degrees.

* * * * *